Patented Feb. 24, 1948

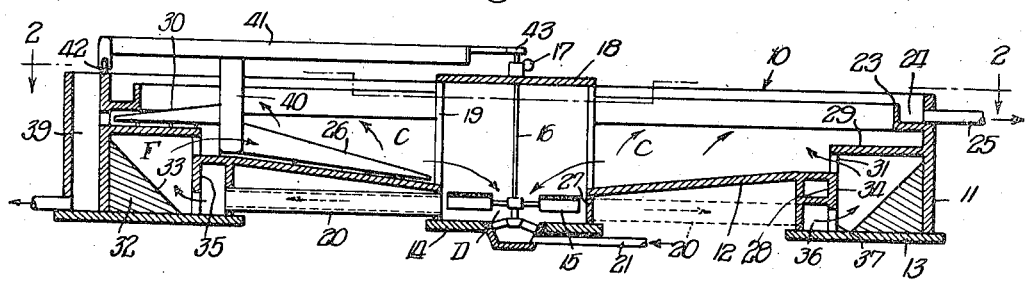
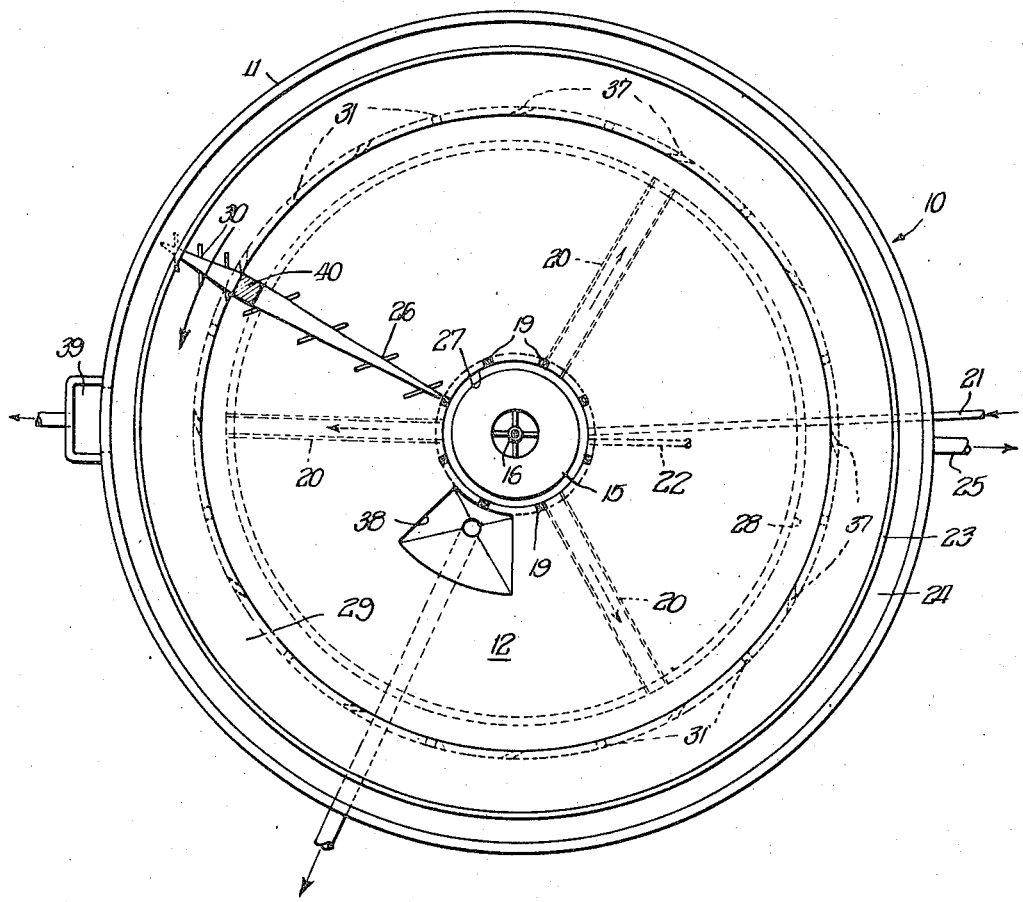

2,436,749

UNITED STATES PATENT OFFICE 2,436,749

LIQUID TREATMENT TANK WITH CONCENTRIC COMPARTMENTS AND WITH CONDUITS BELOW AN INNER BOTTOM PORTION

John Galandak and Ewald A. Kamp, Chicago, Ill., assignors to Graver Tank & Mfg. Co., Inc., a corporation of Delaware Application October 23, 1944, Serial No. 560,062

4 Claims. (Cl. 210—16)

1

This invention relates to liquid treatment, particularly to tanks for the removal of hardness, turbidity and the like by processes involving precipitation of sludge and sedimentation thereof, with sludge filtration and sludge recirculation. Our invention is useful mainly for such tanks which are large, circular and shallow, having a diameter ranging from about 40 to about 200 ft. and a depth ranging from about 8 to about 20 ft. Tanks of such type and size provide capacity for the treatment of liquid, particularly water, in amounts ranging up to many million gallons per day. Additional millions of gallons of sludge are recirculated in these tanks, for rapid precipitation and clarification.

It is an object of our invention to provide such a tank which is economical to build and to operate while treating the liquid with a maximum of efficiency.

Another object is to provide a maximum of sedimentation area and flocculation volume in such a tank, with a minimum of cost and trouble.

Another object is to provide a substantially enclosed flocculation zone in such a tank in a manner which does not add unduly to the size and cost of the tank and which is efficient to operate.

Another object is to reduce the movable structures in such a tank to a minimum and to maintain, at the same time, proper velocities and liquid conditions in the several parts of the tank.

These and other objects will be more clearly understood upon consideration of the detailed description which follows.

In the drawing,

Figure 1 is a central vertical section through one embodiment of our invention.

Figure 2 is a plan view, taken along lines 2—2 of Figure 1.

We provide a large, circular, shallow tank 10, defined by wall and bottom members presenting a peculiar outline. In the embodiment as shown, the tank is surrounded by a cylindrical concrete wall 11. This wall rests on an annular bottom slab 13. Adjacent the inside edge of the annular bottom or floor slab, a cylindrical wall 28 is erected, which extends upward to a level between the top and bottom of the outer wall 11. From the top of this wall 28, a further annular bottom or floor slab 12 extends inward, desirably with a slight inclination or slope towards the center, whereby it forms a flat, inverted, truncated cone. From the inner end of this flat, conical bottom portion 12, a cylindrical wall 27 extends downward, which rests on an innermost, bottom or floor slab 14 of substantially circular shape. Thus the

2 wall and bottom boundary of the tank comprises a series of annular members extending as follows, starting at the top edge of the tank: downward, then inward, then upward, then again inward, then again downward, and then again inward. The several parts 11, 13, 28, 12, 27, 14 are concentrically arranged.

The innermost wall 27 and bottom part 14 cooperate to define a distributing and mixing sump D. The wall 28, bottom ring 13 and lower part of wall 11 define a channel containing a flocculation zone F. Above these zones D, F and the intermediate bottom part 12 there is a clarification zone C. The zones D and F may be considered as lower expansions of or sumps below the zone C. Similarly the wall and bottom portions 27, 14 at the center, and 28, 13 near the outside, may be considered as depressed parts of the bottom structure 12; or conversely, the bottom portion 12, may be considered as a part of the bottom structure, raised above the portions 13, 28, 27, 14.

In the central, depressed zone D we provide a mixer and circulator 15. This device 15 is horizontally rotated by the central vertical shaft 16, which is driven by a motor reducer 17 at the top of the tank, supported by a platform 18. The platform is supported by posts 19 around the central sump or depression D.

Distributing pipes 20 extend radially and horizontally from the central sump D to the peripheral sump F, below the raised part of the bottom 12 so that upon rotation of the impeller, a liquid circulation is maintained outwardly through these distributing pipes, then through the peripheral sump, inwardly over the raised bottom, and back into the central sump.

Raw liquid to be treated enters the central sump through an inlet pipe 21 and chemical reagents for the treatment of the liquid are added, preferably by means of a separate inlet 22 which may terminate in the same sump. The raw liquid and the chemicals are mixed with the circulating liquid, due to the action of the impeller. Treated liquid is removed from the top of the tank by means of an overflow weir 23 associated with an outlet launder 24, mounted on the wall 11, and discharging to service or storage through an outlet pipe 25. Precipitated sludge collects upon the raised bottom 12, and is removed by a scraper means 26 which rotates slowly over said bottom.

The peripheral channel and flocculation zone F are surmounted by an annular baffle, tray or false bottom 29 extending inwardly from the wall 11 above the flocculation zone, and terminating adjacent and above the top of wall 28 and substantially below the top of the tank. This baffle defines the flocculation zone F against the overlying, outer part of the clarification zone C, and deflects the aforementioned liquid circulation so that the circulating flow is safely maintained in an inward direction in the clarification zone; that is, so that upwardly directed stray currents or boil-ups of sludge in the clarification zone are prevented. Inasmuch as sludge is apt to settle on top of the baffle 29 the scraper mechanism 26 desirably includes a part 30 operating over the top of this baffle. The inner edge of the baffle 29 may be supported by posts 31 extending upwardly from the top of the wall 28.

The flocculation zone F is located within the annular sump between the walls 11 and 28, and is further defined by an outer corner fill 32, presenting on the inside a surface 33 which has the shape of an inverted, truncated cone, suitably inclined from the horizontal so that no such sludge may collect upon this surface but so that any such sludge will slide down. The inner limit of the flocculation zone F is defined by a cylindrical surface 34 presented by a partition or wall member 35 whereby there is formed, between the walls 35 and 28, an annular chamber 36 on the inside of the outer depression or sump. This annular chamber 36 is used as a distributing duct.

Relatively few distributing pipes 20 are needed in conjunction with such an annular distributing duct 36; generally there may be only about three or four, or sometimes up to six distributing pipes 20, if such a duct is provided; and in some instances there may be only two or one. If there is only one, the pipe might be identified as a recirculating pipe or the like, and all the distributing is achieved by the annular duct; however, the term distributing zone or means is used herein, regardless of the number of pipes; it designates the control sump D, pipe or pipes 20, and duct 36. The latter duct discharges into the flocculation zone F by a suitable number of discharge openings 37. These are formed in the bottom part of the wall 35, and directed to discharge in a direction at least comprising a component which is tangential of the annular flocculation zone. Thus we maintain a horizontal rotation of liquid whereby gentle agitation of the water and flocculation of impurities take place in said zone. Due to the cornerfill 32, this rotation is relatively rapid in the bottom part of the flocculation zone, and slower in the top thereof.

Sludge settling on the bottom 12 is collected by the scraper device 26, scraping the sludge into an outlet sump 38. This sump is recessed into the bottom 12 adjacent the central distributing sump 14 and is drained in the usual manner. Additional sludge is collected by the scraper device 30, over the annular baffle or tray 29, and is removed through a separate sump 39, which may be located on the outside of the wall 11 as shown. The two sumps 38 and 39 can be identified as sludge outlet means, located in the path of the sludge scraper means 26 and 30 respectively, and communicating with localized portions of the chamber C. The two scraper devices 26 and 30 may be carried by a common structural means 40 depending from a bridge 41. This bridge is rotatably supported by a carriage 42 on the top wall 11, and by a central pivot 43 on the platform 18, and is driven by well-known means (not shown).

In operation, the raw liquid entering through the pipe 21 and the chemicals entering through the pipe 22 are mixed with sludge recirculated into the distributing sump D by the rotating member 15. The mixture is expelled from said sump by the same rotating member, through the distributing pipes 20, into the distributing duct 36. From here it is distributed into the bottom of the flocculation zone F in a rotary flow which expands upwardly, and ultimately turns inwardly, below the baffle 29. The circulating flow returns inwardly over the bottom 12, while treated liquid is displaced toward the overflow weir 23 and outlet means 24, 25. These various flows are suggested by arrows in Figure 1.

Due to the contact of the chemicals with the impurities of the raw water, a flocculent sludge is precipitated. The flocs of sludge or particles are built up to a highly settleable condition by means of the contact with recirculated sludge, the gentle agitation and flocculation in the confined zone F, and the continuing, extended and quiescent contact treatment in the return flow over the bottom 12.

The sludge particles formed have, of course, vastly different settleability. The lightest particles are entrained relatively far towards the overflow weir 23. Most of these settle on the annular tray 29. Heavier particles settle from the recirculating flow, on the bottom 12. The very heaviest particles may tend to settle in the flocculation zone itself; however, due to the downwardly tapering design of this zone, such particles slide back over the surface 33 into the rapidly rotating liquid in the bottom part of the flocculation zone, to be broken up into relatively less settleable flocs, which are carried up by the liquid, to be ultimately settled either on the bottom 12 or on the tray 29.

It will be noted that a single impeller 15 can maintain all the liquid motion required, that is, the relatively fast motion for initially mixing the several materials and impelling the mixture through the distributing pipes and duct, the slower motion in the flocculation zone, and the extremely slow motion in the bottom of the clarification zone. A single shaft 16 and motor reducer 17 are required for this impeller. The size of the motor can be relatively small, since a minimum of head absorbing restrictions and the like are interposed on the circulating flow, and particularly on the rapid part of said flow, wherein the loss of head due to restrictions and the like is relatively high.

It will be noted further that the tank construction involves a minimum of cost. The most costly item in the construction of such tanks is the concrete work, especially that which is used for walls or false bottoms. Other important items, although much less important individually, are the necessary excavation, the piping, and the movable equipment. In the present instance the total volume of the walls 11, 27 and 28 and false bottom 29 is particularly small, due to the space-saving arrangement of the several zones, and the narrow annular design of the false bottom.

The flocculation zone F is substantially arranged below an outer annular part of the clarification zone C, and separated therefrom by the baffle tray or false bottom 29. The advantage of this arrangement is that a substantial outer part of the tank serves both purposes of flocculation and clarification. It is quite sufficient for the outermost part of the clarification zone that an extremely shallow depth should be provided for the same, the flow being spread out over a great area. Thus the remaining portion of the depth of the tank is available for the flocculation zone.

Further, important advantages are gained by means of the peculiar arrangement of the zones F and C, in connection with the liquid motion in both zones.

For efficient flocculation, it is important that the flow velocities should closely approximate the ideal velocities which are conducive to a maximum number of floc collisions, with a minimum tendency towards floc break-up, that is, generally about 2 feet per second with tolerances of about 50 per cent plus and minus. Such approximately ideal velocities should prevail throughout the flocculation zone. This is easily achieved in a long, annular zone with rotary flow, as herein provided. Much greater differences of velocity would be set up in a cylindrical zone of equal volume, except if an expensive multitude of agitating impellers were used.

For rapid clarification with sludge filtration it is essential that a very critical flow velocity be maintained, suspending sufficient sludge for sludge filtration, but avoiding objectionable boil-ups. In this respect it is a great advantage that in the present tank, such a flow, at a critical velocity, passes only over the intermediate bottom portion 12, and not over the outer, false bottom 29, adjacent the outlet weir 23. Quite a sufficient amount of sludge for efficient sludge filtration is easily suspended by the flow circulating over the bottom portion 12. The danger of excessive recirculating velocities is minimized; should such excessive velocities occur, and should they carry sludge up to the liquid level, this will only occur in an area remote from the outlet region.

Accordingly, the treatment applied in this tank is efficient, and a minimum detention time is sufficient to produce adequate results. This means a wall 11 of minimum length and depth, with further resulting savings in cost. Such savings are also achieved by the provision of a bottom 13, 28, 12, 27, 14 of minimum size, and pipes 20 of minimum length, as well as a motor reducer 17 and impeller 15 of simple design and small size.

Of course some special structures are required in order to gain these advantages, including mainly the walls, 28, 27 and baffle 29 providing the various zones as described. These however, are not serious as cost elements. In many instances it will be desirable to excavate by power means a cylindrical pit for the tank, said cylinder having a diameter to accommodate the wall 11 and having a flat bottom at the elevation selected for the depressed parts 13, 14 of the tank bottom. Thereupon necessary trenches for the inlet pipes 21, 22 and vertical shafts for outer chambers such as 39 can be excavated by hand. Thereafter it will frequently be desirable, first to build the walls 11 and 28 to the proper height and then to provide a cinder fill both for the corner fill 32 and also between the walls 28 and 27, as a support for the raised portion 12 of the bottom; the pipes 20 being imbedded in this cinder fill. Thus the bottom 12 can be placed with a minimum of structural support and formwork. Thereupon it is relatively easy to provide the further wall 35, posts 19 and 31, platform 18, and tray 29.

In some instances the wall 35 and channel 36 can be eliminated, and instead a greater number of distributing pipes 20 can be provided. It is also possible to eliminate the corner fill 32, in some instances, and to make various other changes in the present design.

We claim:

1. A liquid treatment tank of large diameter and relatively shallow depth, comprising a peripheral wall; a bottom which comprises an outer, annular bottom portion in contact with the inside of said wall and an inner, substantially flat bottom portion above said outer one; an annular tray inwardly extending from said wall over said outer bottom portion to above but adjacent a peripheral part of said inner bottom portion, to form a depressed annular channel below said tray, a shallow chamber above said tray and inner bottom portion and a passage between said tray and peripheral part; conduits below said inner bottom portion, having inner ends communicating with a central part of the tank and outer ends communicating with said channel; means to pass liquid outwardly through said conduits; inlet means for liquid to be treated and required reagent, discharging into said central part; liquid outlet means at the top of the tank; scraper means adapted to rotate in said shallow chamber and to scrape sludge settled from liquid in said shallow chamber to a localized portion of said shallow chamber; means to rotate said scraper means; and sludge outlet means in said localized portion.

2. A liquid treatment tank of large diameter and relatively shallow depth, comprising a peripheral wall; a bottom which comprises an outer, annular bottom portion in contact with the inside of said wall and an inner, substantially flat bottom portion above said outer one; a flat annular tray extending inwardly and substantially horizontally from said wall over said outer bottom portion to above but adjacent a peripheral part of said inner bottom portion, to form a depressed annular channel below said tray, a shallow chamber above said tray and inner bottom portion and a passage between said tray and peripheral part; conduits below said inner bottom portion, having inner ends communicating with a central part of the tank and outer ends communicating with said channel; means to pass liquid outwardly through said conduits; inlet means for liquid to be treated and required reagent, discharging into said central part; liquid outlet means at the top of the tank; scraper means adapted to rotate over said tray and to scrape sludge, settled from liquid in said shallow chamber upon said tray, to a localized portion of said shallow chamber; means to rotate said scraper means; and sludge outlet means in said localized portion.

3. A liquid treatment tank according to claim 2 comprising posts spaced along and supported by the peripheral part of said inner bottom portion, and supporting the inner edge of said flat, annular tray.

4. A liquid treatment tank of large diameter and relatively shallow depth, comprising a peripheral wall; a bottom which comprises an outer, annular bottom portion in contact with the inside of said wall and an inner, substantially flat and circular bottom portion above said outer one; an annular tray inwardly extending from said wall over said outer bottom portion to above but adjacent a peripheral part of said inner bottom portion, to form a depressed annular channel below said tray, a shallow chamber above said tray and inner bottom portion and a passage between said tray and peripheral part; conduits below said inner bottom portion, having inner ends communicating with a central part of the tank and outer ends communicating with said channel; means to pass liquid outwardly through said conduits; inlet means for liquid to be treated and required reagent, discharging into said central part; liquid outlet means at the top of the tank; scraper means adapted to rotate over said inner bottom portion and to scrape sludge, settled from liquid in said shallow chamber upon said inner bottom portion, to a localized portion of said shallow chamber; means to rotate said scraper means; and sludge outlet means in said localized portion.

JOHN GALANDAK.
EWALD A. KAMP.

REFERENCES CITED

The following references are of record in the file of this patent:

UNITED STATES PATENTS

| Number | Name | Date |
|---|---|---|
| 2,245,588 | Hughes | June 17, 1941 |
| 2,348,123 | Green et al. | May 2, 1944 |
| 2,353,358 | Prager | July 11, 1944 |